United States Patent [19]

Suzuki et al.

[11] 4,225,802
[45] Sep. 30, 1980

[54] PIEZOELECTRIC KNOCKING DETECTOR FOR INTERNAL COMBUSTION ENGINE

[75] Inventors: Yutaka Suzuki, Nishio; Osamu Ito, Toyota; Nobuhito Hobo, Inuyama; Kenji Goto, Susono; Daisaku Sawada, Susono; Takashi Shigematu, Susono; Yuji Takeda, Susono, all of Japan

[73] Assignees: Nippondenso Co., Ltd., Kariya; Toyota Jidosha Kogyo Kabushiki Kaisha, Toyota, both of Japan

[21] Appl. No.: 3,777

[22] Filed: Jan. 9, 1979

[30] Foreign Application Priority Data

Feb. 23, 1978 [JP] Japan .................................. 53-20432
Apr. 26, 1978 [JP] Japan ............................. 53-56362[U]

[51] Int. Cl.² ............................................ H01L 41/10
[52] U.S. Cl. .................................... 310/321; 310/329
[58] Field of Search ................ 310/329, 338, 321, 323

[56] References Cited

U.S. PATENT DOCUMENTS

| | | | |
|---|---|---|---|
| 2,411,401 | 11/1946 | Welch | 310/329 |
| 2,972,006 | 2/1961 | Shoor | 310/329 X |
| 3,075,098 | 1/1963 | Shoor | 310/329 |
| 3,145,311 | 8/1964 | Dickey | 310/329 |
| 3,394,275 | 7/1968 | Lippmann | 310/329 |
| 3,819,962 | 6/1974 | Ivey et al. | 310/323 |
| 4,110,654 | 8/1978 | Paul | 310/323 |

FOREIGN PATENT DOCUMENTS 909257  7/1949  Fed. Rep. of Germany ........... 310/329

*Primary Examiner*—Mark O. Budd
*Attorney, Agent, or Firm*—Cushman, Darby & Cushman

[57] ABSTRACT

A knocking detector for an internal combustion engine includes a vibration unit comprising an inertial mass member and springs which are mounted in a housing attached to an engine body. The spring constants of the springs are so selected that the resonant frequency of the vibration unit becomes substantilly equal to the frequency of vibration due to knocking of the engine, and the vibration of the vibration unit is detected and converted into an electric signal.

4 Claims, 4 Drawing Figures

PIEZOELECTRIC KNOCKING DETECTOR FOR INTERNAL COMBUSTION ENGINE

BACKGROUND OF THE INVENTION

1. Field of the Invention

The present invention relates to a knocking detector for detecting the occurrence of knocking from the vibration of an internal combustion engine.

2. Description of the Prior Art

A method of detecting the occurrence of knocking in an internal combustion engine is known in the art in which knocking is detected from the vibration of the engine. This method makes use of the fact that when knocking occurs, the vibration due to the combustion chamber pressure causes a mechanical vibration in the parts of the engine. Pressure vibrations due to knocking of the ordinary automobile engines fall within the range of 5 to 15 KHz, and the value of vibration is substantially constant according to the type of an engine. Consequently, by detecting the vibration with a vibration detector, it is possible to detect the knocking. However, due to the fact that an engine body involves vibration factors due to the combustion and movement of the engine parts, in order to detect the occurrence of knocking (i.e., to detect the vibration due to knocking), it has been necessary to deal with the knocking vibration frequency band by an electrical circuit comprising a band-pass filter or the like.

SUMMARY OF THE INVENTION

It is an object of the invention to provide a knocking detector for an internal combustion engine which comprises an inertial mass member received in a housing attached to an internal combustion engine body, a spring whose spring constants are selected in such a manner that the resonant frequency dependent on the mass of the inertial mass member and the spring constants is made substantially equal to the frequency of vibration caused by knocking of the engine, and transducer means for detecting the vibration of the inertial mass member by converting the same into an electric signal.

It is another object of the invention to provide a knocking detector comprising a housing attached to an internal combustion engine body, an inertial mass member received in the housing, springs each disposed for engagement with the inertial mass member, the springs having spring constants so selected that the resonant frequency depending on the mass of the inertial mass member and the spring constants becomes substantially equal to the frequency of vibration caused by knocking of the engine, and transducer means for detecting the vibration of the inertial mass member by converting the same into an electric signal, whereby eliminating the need to use a band-pass filter in the succeeding electric circuit and thereby reducing the cost of the electric circuit.

It is still another object of the invention to provide a knocking detector comprising a housing attached to an internal combustion engine body, a piezoelectric element having one face connected to the housing by way of a first spring and the other face connected by way of an inertial mass member and a second spring to an electrical conductor for delivering an electric signal to the outside, and an insulating member attached to the housing to press the piezoelectric element against the housing with a predetermined load by way of the conductor, the springs and the inertial mass member and to electrically insulate the conductor from the housing, the resonant frequency of a vibration system comprising the inertial mass member and the two springs being selected so as to become substantially equal to the frequency of vibration caused by knocking of the engine, thus eliminating the need to use a band-pass filter in the succeeding electric circuit and thereby making it possible to reduce the cost of the electric circuit.

DESCRIPTION OF THE PREFERRED EMBODIMENTS

Figure 1:
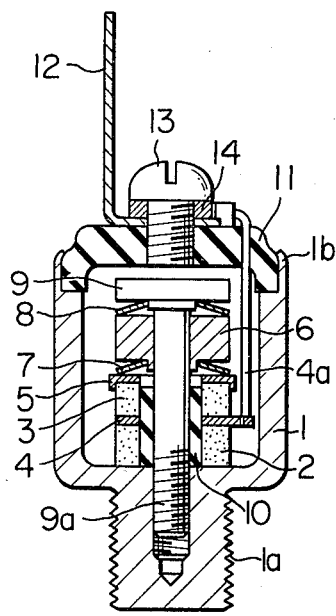
FIG. 1 is a sectional view showing a first embodiment of the invention.

Referring now to FIG. 1 showing a first embodiment of the invention, numeral 1 designates an electrically conductive housing attached by its threaded portion 1a to an engine body or engine block which is not shown so as to be vibrated together with the engine block. Numerals 2 and 3 designate piezoelectric elements each responsive to an elastic strain to become electrically polarized to generate a voltage across its opposite ends, and the piezoelectric element 2 has its one face contacted with the housing 1 and the other face contacted with one face of a conductive electrode 4 whose other face is contacted with one face of the piezoelectric element 3 having its other face contacted with and fixedly held in place by an electrically conductive spring bearing 5. Numeral 6 designates an electrically conductive inertial mass member having its opposite faces engaged with and held in place by two electrically conductive "leaf springs" or flush springs 7 and 8 which are disposed in such a manner that the spring 7 has its other face contacted with the spring bearing 5 and the spring 8 has its other face contacted with an electrically conductive bolt 9. The bolt 9 extends through the flush spring 8, the inertial mass member 6, the flush spring 7, the spring bearing 5, the piezoelectric element 3, the electrode 4 and the piezoelectric element 2 so that these component parts 2, 3, 4, 5, 6, 7 and 8 are fixedly held in place between the bolt 9 and the housing 1 by a threaded portion 9a so as to be integral with the housing 1, and also the bolt 9 functions as a guide member which sets the initial loads of the flush springs 7 and 8 and determines the direction of movement of the inertial mass member 6. The inertial mass member 6 is mounted on the bolt 9 so as to verticaly vibrate along the bolt 9 against the flush spring pressures. Numeral 10 designates a ring made of an insulating material which insulates the bolt 9 from the component unit comprising the piezoelectric elements 2 and 3 and the electrode 4. Numeral 11 designates a cover fixedly held in place by caulking and by a cup-shaped open-end portion 1b of the housing. Numeral 4a designates an electric conductor for connecting the electrode 4 to a signal output terminal 12. Numeral 13 designates a conductive bolt for attaching the terminal 12 to the cover 11 by way of a spring washer 14.

The mass m of the inertial mass member 6 and the spring constants $k_7$ and $k_8$ of the flush springs 7 and 8 are selected so that the natural vibration frequency or resonant frequency $f_c$ of the vibration system comprising the mass member 6 and the flush springs 7 and 8 becomes substantially equal to the frequency of vibration due to knocking of the engine. The resonant frequency $f_c$ of the vibration system is given by the following equation using the circular constant $\pi$.

$$f_c = 1/2\pi \sqrt{(k_7+k_8)/m}$$

With the construction described above, the knocking detector operates as follows. When knocking combustion occurs in the engine combustion chamber, the resulting combustion impulse wave is transmitted as mechanical vibration to the engine block by way of the cylinder head. Thus, the housing 1 fixed to the engine block is vibrated at the natural knocking vibration frequency. In this case, since the resonant frequency $f_c$ of the vibration system comprising the inertial mass member 6 and the flush springs 7 and 8 is selected substantially equal to the knocking vibration frequency, the piezoelectric elements 2 and 3 are struck with a strong force by way of the spring bearing 5. As a result, a voltage is generated across the piezoelectric elements 2 and 3 and the output voltage is produced from the terminal 12, thus detecting the knocking.

In this connection, while the engine itself has factors which cause vibrations at frequencies which fall within the range of the knocking vibration frequencies, these vibrations are generally low as compared with the knocking vibrations, and consequently by suitably selecting the discrimination level of the succeeding discrimination circuit which discriminates the output voltage of the knocking detector, it is possible to discriminate the knocking. On the other hand, any vibration frequency which is outside the knocking vibration frequency range is deviated from the resonant frequency of the knocking detector, and consequently the resulting output from the piezoelectric elements 2 and 3 is so small that it can be neglected.

Figure 2:
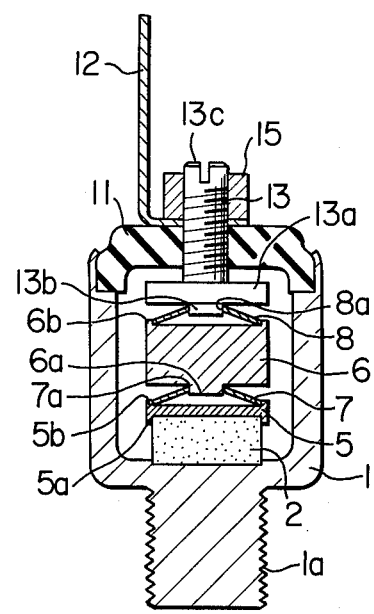
FIG. 2 is a sectional view showing a second embodiment of the invention.

Referring now to FIG. 2, a second embodiment of the invention will now be described. The second embodiment comprises a conductive housing 1, a piezoelectric element 2 which is firmly held in place in an electrically conductive manner, a conductive spring bearing 5 disposed on the upper face of the piezoelectric device 2 and a conductive inertial mass member 6 held between conductive flush springs 7 and 8 and disposed between the spring bearing 5 and a flange 13a of a conductive bolt 13. The spring bearing 5 is formed on its outer peripheral portions with a hooked guide 5a adapted for engagement with the piezoelectric device 2 and a hooked guide 5b adapted for engagement with the flush spring 7, and the inertial mass member 6 is formed on its lower face with a projection 6a adapted for engagement with a central hole 7a of the flush spring 7 and on its upper face outer periphery with a hooked guide 6b adapted for engagement with the flush spring 8, and the flange 13a of the bolt 13 is formed on its lower surface with a projection 13b adapted for engagement with a central hole 8a of the flush spring 8, thus serving the function of firmly holding the component parts 2, 5, 7, 6 and 8 between the housing 1 and the bolt 13. A terminal 12 is fitted to a cover 11 by a conductive nut 15 adapted for screwing on the bolt 13. One of the electrodes of the piezoelectric device 2 is grounded. An adjusting groove 13c is formed in the top end of the bolt 13 thus making it possible to adjust the initial loads of the flush springs 7 and 8 as desired.

The second embodiment operates in the similar manner with the first embodiment and its operation will not be described.

Figure 3:
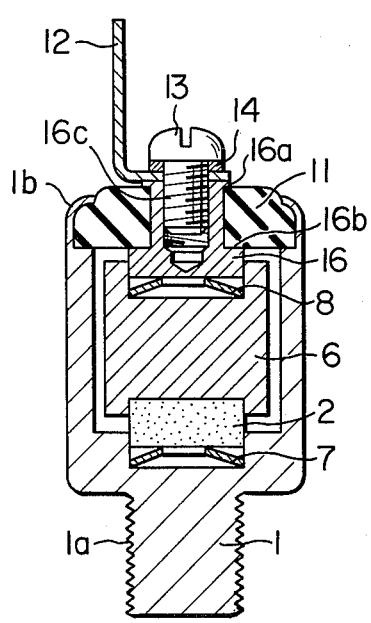
FIG. 3 is a sectional view showing a third embodiment of the invention.

Referring now to FIG. 3, there is illustrated a sectional view showing the construction of a knocking detector according to a third embodiment of the invention. In the Figure, a piezoelectric device 2 has its one end face connected to the housing 1 by way of a flush spring or first spring 7 made of an electrically conductive material and its other face contacted with an electrically conductive inertial mass member 6, and the inertial mass member 6 is in contact with a flush spring or second spring 8 made of a conductive material. Each of the flush springs 7 and 8 has a frustoconical cylindrical structure as shown in the Figure. Numeral 16 designates a conductor for delivering an electric output of the piezoelectric device 2 to the outside. The inertial mass member 6 is slidably fitted on the conductor 16, the device 2 is also slidably fitted in a lower recessed portion of the housing 1, and the member 6 can vertically vibrates together with the device 2. An insulating spacer 11 is fixed in place by caulking so as to be held between an upper flange 16a and a central shoulder 16b of the conductor 16. The conductor 16 is formed with a threaded hole 16c extending axially from the upper end of the conductor 16.

In operation, when knocking combustion occurs in the engine combustion chamber, the resulting impulse wave is transmitted as mechanical vibration to the engine block by way of the piston and the cylinder block. Consequently, the housing 1 is vibrated at the natural knocking vibration frequency. In this case, since the resonant frequency of the vibration system comprising the inertial mass member 6 and the flush springs 7 and 8 is selected so as to be substantially equal to the frequency of vibration due to knocking, when knocking occurs, the inertial mass member 6 and the piezoelectric device 2 make a large vibrating motion as a unit and consequently the corresponding vibrational force is applied to the piezoelectric device 2 by the flush spring 7. As a result, the piezoelectric device 2 generates a voltage across its end faces and the output voltage is delivered through a terminal 12, thus detecting the knocking.

Figure 4:
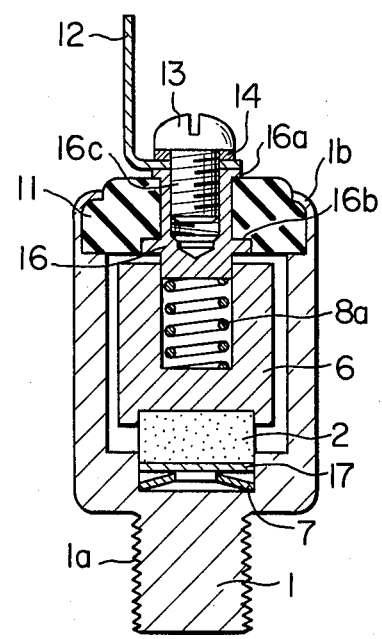
FIG. 4 is a sectional view showing a fourth embodiment of the invention.

Referring now to FIG. 4, a fourth embodiment of the invention will be described. As shown in the Figure, the fourth embodiment differs from the third embodiment of FIG. 3 in that the first spring or flush spring 8 is replaced with a compression spring 8a made of a conductive material, and by selecting the spring constant $k_{8a}$ of the compression spring 8a in a manner that $k_{8a} << k_7$, the resonant frequency $f_c$ is given by $$f_c = 1/2\pi\sqrt{(k_{8a}+k_7)/m} \approx 1/2\pi\sqrt{k_7/m}$$

Thus, the use of the compression spring 8a has the effect of reducing variations in the strain due to difference in thermal expansion among the component parts due to temperature changes, variations in the accuracy of finishing, etc., and thereby ensuring substantially a constant initial set load for the piezoelectric device 2.

Although the above equation of $f_c$ for the embodiment of FIG. 4 also holds with the embodiment of FIG. 3 by modifying the respective spring constants accordingly, it is needless to say that the factor "m" represents in the two embodiments the sum of the mass of the inertial mass member 6 and that of the piezoelectric element 2 since they vibrate as a unit.

It is evident that the similar operation can be ensured by providing a conductive flat plate 7 as a spring bearing between the flush spring 7 and the piezoelectric device 2 so as to make uniform the force applied to the piezoelectric device 2.

We claim:

1. A knocking detector for an internal combustion engine comprising:

a housing attached to a body of an engine for vibration together with said body;

piezoelectric means having one of the opposite faces thereof connected with said housing by way of a first spring and the other face connected by way of inertial mass means and a second spring with conductive means disposed to deliver an electric output to outside; and insulating means attached to said housing to press said piezoelectric means against said housing through said conductive means, said first and second springs and said inertial mass means under a predetermined load, said insulating means electrically insulating said conductive means from said housing;

wherein the resonant frequency of a vibration system comprising said inertial mass means and said first and second springs is selected so as to be substantially equal to a frequency of vibration caused by knocking of said engine.

2. A detector according to claim 1, wherein said mass means includes first and second recesses respectively formed in the lower and upper surfaces thereof, wherein said piezoelectric means has the one end embedded and held in said first recess and the other end slidably fitted in a depression formed in said housing in opposition to said first recess to press said first spring mounted in said housing depression, and wherein said conductive means is slidably fitted in said second recess to press said second spring mounted therein.

3. A detector according to claim 2, wherein said second spring is a compression spring, and wherein said piezoelectric means is disposed to press said first spring through a conductive flat plate.

4. A knocking detector for an internal combustion engine comprising:

a housing attached to a body of an engine for vibration together with said body;

piezoelectric means having one of the opposite faces thereof connected with said housing and the other face connected by way of a first spring, inertial mass means and a second spring with conductive means disposed to deliver an electric output to outside; and insulating means attached to said housing to press said piezoelectric means against said housing through said conductive means, said first and second springs and said inertial mass means under a predetermined load, said insulating means electrically insulating said conductive means from said housing;

wherein the resonant frequency of the vibration system comprised of said inertial mass means and said first and second springs is selected so as to be substantially equal to the frequency of vibration caused by knocking of said engine.

* * * * *